United States Patent [19]

Weber

[11] Patent Number: 4,537,752

[45] Date of Patent: Aug. 27, 1985

[54] METHOD FOR REMOVING HYDROGEN SULFIDE FROM GAS STREAMS

[75] Inventor: Gunter Weber, Linden, Fed. Rep. of Germany

[73] Assignee: Linde Aktiengesellschaft, Wiesbaden, Fed. Rep. of Germany

[21] Appl. No.: 631,706

[22] Filed: Jul. 17, 1984

Related U.S. Application Data

[63] Continuation-in-part of Ser. No. 455,703, Jan. 5, 1983, abandoned.

[30] Foreign Application Priority Data

Oct. 26, 1982 [DE] Fed. Rep. of Germany ....... 3239602

[51] Int. Cl.$^3$ ...................... B01D 53/34; C01B 17/05
[52] U.S. Cl. .................... 423/224; 423/226; 423/228; 423/232; 423/573 R; 252/189; 252/192
[58] Field of Search .................. 423/224, 226, 573 R, 423/573 G, 228, 229, 232, 233, 220; 252/189, 190, 192

[56] References Cited

U.S. PATENT DOCUMENTS

| | | | |
|---|---|---|---|
| 4,036,942 | 7/1977 | Sibeud et al. | 423/226 X |
| 4,283,379 | 8/1981 | Fenton et al. | 423/226 X |
| 4,374,104 | 2/1983 | Primach | 423/573 |

FOREIGN PATENT DOCUMENTS 1488659 10/1977 United Kingdom ................ 423/226

*Primary Examiner*—Earl C. Thomas
*Attorney, Agent, or Firm*—Millen & White

[57] ABSTRACT

For the simultaneous absorption and oxidation of hydrogen sulfide, gaseous mixtures substantially free of molecular oxygen are scrubbed in a first stage with an aqueous, alkaline scrubbing agent containing pentavalent vanadium as the oxidizing medium. The hydrogen sulfide is absorbed by the scrubbing agent and oxidized to elemental sulfur with reduction of pentavalent vanadium to tetravalent vanadium. The thus-reduced scrubbing agent is then regenerated in a separate second stage in the presence of an amine promoter by reoxidation of the tetravalent vanadium with molecular oxygen, and reused.

16 Claims, No Drawings

METHOD FOR REMOVING HYDROGEN SULFIDE FROM GAS STREAMS

CROSS-REFERENCE TO RELATED APPLICATION

This application is a continuation-in-part of application Ser. No. 455,703, filed Jan. 5, 1983, and now abandoned.

BACKGROUND OF THE INVENTION

This invention relates to a process for the removal of hydrogen sulfide from gaseous mixtures by simultaneous absorption and oxidation of $H_2S$ with an aqueous, alkaline scrubbing agent containing pentavalent vanadium as the oxidizing agent, and wherein the reduced scrubbing agent is regenerated in the presence of a promoter by reoxidation of the tetravalent vanadium, and reused. The invention is particularly directed to novel promoters.

It is known from British Pat. No. 1,488,659 for the $H_2S$-containing gas to be purified to be scrubbed with an aqueous, alkaline solution, such as a sodium carbonate solution having a pH of between 8 and 9 and containing a soluble salt, such as the sodium salt of anthraquinone disulfonic acid and a metallic vanadate, the vanadium being present in the pentavalent oxidation stage. The absorbed hydrogen sulfide is ionized in the solution with the formation of $HS^-$ ions which reduce the vanadium into the tetravalent oxidation stage, thus liberating elemental sulfur. The thus-reduced vanadium can be reoxidized by an oxidation reaction with an oxygen-containing gas in the presence of a promoter, such as, for example, anthraquinone disulfonic acid (ADS). To maintain the vanadium in solution in the presence of hydrogen sulfide, a complexing agent in the form of tartaric acid, for example, can also be added to the scrubbing solution. This process based on ADS, while satisfactory in many respects, is relatively costly, and on occasion is beset with technical difficulties. Another process is known from U.S. Pat. No. 4,283,379. A still further process is that described in U.S. Pat. No. 4,036,942, wherein the oxidation-reduction of the metal chelate reaction system is conducted concurrently and wherein, according to claim 1 of the patent, the gaseous stream is always contacted with free oxygen and an aqueous solution of the catalyst.

SUMMARY

An object of the present invention is to provide additional promoters so as to improve the step of regenerating the vanadium, and to provide new alkaline scrubbing solutions based on said promoters.

Another object is to provide an improved overall process of absorbing and converting $H_2S$ to elemental sulfur with the aid of vanadium in a simple and economical manner.

Upon further study of the specification and appended claims, further objects and advantages of this invention will become apparent to those skilled in the art.

To attain these objects, new promoters are employed as a substitute ADS. Such new promoters comprise sources of organic nitrogen compounds especially amines and inorganic amines. By "source" is meant a stream containing either the new promoter, or precursors thereof which will form the new promoter in the scrubbing and regenerating cycle, or a compound which will form when the new promoter is brought into contact with the sour gases. In addition, the process of this invention comprises separate and distinct stages conventional to this art aside from U.S. Pat. No. 4,036,942. Thus, the improved overall process of this invention for the simultaneous absorption and oxidation of hydrogen sulfide to sulfur, comprises the steps of scrubbing in a scrubbing stage a gas consisting essentially of a sour gas containing $H_2S$, i.e. a gas essentially or completely free of molecular oxygen with an aqueous, alkaline scrubbing solution containing pentavalent vanadium as the oxidizing agent, wherein the hydrogen sulfide is absorbed by the scrubbing agent and oxidized by pentavalent vanadium to elemental sulfur with reduction of the pentavalent vanadium to tetravalent vanadium, and then regenerating in a regeneration stage separate from the scrubbing stage the thus-reduced scrubbing solution in the presence of a promoter by reoxidation of the tetravalent vanadium gas to pentavalent vanadium with a gas containing molecular oxygen, and wherein the scrubbing solution consists essentially of sodium carbonate, vanadium and an amine-type promoter which is especially either a soluble salt of an aminocarboxylic acid, or an amine having no carboxyl groups.

The promoter is preferably selected from the following groups:

(A) An alkyl amine. Within this group there are included, but not limited thereto, such species as, for example, tetrapropylenepentamine, tetraethylenepentamine, triethylenetetramine, tripropylenetetramine, and 3,2-aminoethylaminopropyleneamine. Particularly preferred species include diethylamine, butylamine, triethylenetetramine, hexamethylenediamine, and N,N'-bis(3-aminopropyl)ethylenediamine.

(B) An alkanol amine. Included within this group, but not limited thereto, are such species as, for example, mono-, di-, or triethanolamines, dimethylethanolamine, methyldiethanolamine, methylaminoethanol and dimethylaminopropanol. Preferred species include diethanolamine, dimethylethanolamine, and dimethylaminopropanol, and 2(2-aminoethoxy)ethanol.

(C) Cyclic nitrogen compounds. Preferred species include, but are not limited to piperidine, piperazine and derivatives thereof.

(D) Soluble salts of aminocarboxylic acids. Preferred species include, but are not limited to, aminoacetic acid, imido-bis-acetic acids and aminopropionic acid.

(E) Soluble salts of aminosulfonic acids. Preferred species include, but are not limited to, 2-amino-ethansulfonic acid ($NH_2$—$C_2H_4$—$SO_3H$) and imido-bis-ethansulfonic acid ($HSO_3$—$C_2H_4)_2$—$NH_-$.

(F) Soluble salts of aminosulfuric acids, such as $NH_2$—$SO_3H$ and $NH(SO_3H)_2$.

(G) Soluble salts of inorganic amines, particularly water soluble, stable derivatives of hydroxylamine and hydrazine.

The promoters of this invention are advantageous insofar as they accelerate the reoxidation of tetravalent vanadium, and also keep reduced vanadium in solution. The reoxidation of the reduced vanadium, depending on the particular promoter employed, often occurs more rapidly than in conventional processes of this type, thereby resulting in smaller vessels and smaller quantities of scrubbing liquor, resulting in lower investment and operating costs. Furthermore, the addition of a complexing agent for vanadium, such as citric or tartaric acid, is not required, which likewise leads to cost reduction.

All of the promoters described in (A) to (G), especially in (A) and (B), also have the advantage that they function themselves as alkaline scrubbing agents, thereby enhancing the absorption of hydrogen sulfide.

Particular scrubbing agents are, for example, solutions consisting essentially of sodium carbonate, vanadium, sodium thiocyanate and at least one soluble salt of an amino carboxylic acid selected from the group consisting of amino-acetic acid, imido-bis-acetic acid, and aminopropionic acid.

In contrast to ADS, amines are inexpensive, chemically stable compounds; consequently, the operating costs using amines in the process are generally less than when ADS is employed.

As a preferred embodiment of this invention, the promoter is employed, on the basis of 1.5 g vanadium per liter, in a concentration of 10-100 g/l, preferably 30-50 g/l (the liter referring to a liter of scrubbing solution). The specific values to be used will depend on the promoter utilized, as well as on the vanadium concentration. Consequently, in the light of these concentration ranges, it is a matter of routine experimentation to determine the optimum concentration range for each promoter, but this value will generally be within the disclosed limits of 10-100 g/l. The lower limit of concentration, i.e., 10 g/l, preferably 30 g/l, is particularly important since with lower than 10 g/l, the oxygen activation effect of the promoter is generally unacceptable, and a concentration of at least 30 g/l will yield very good results. In contrast thereto, the upper limit of concentration may be exceeded for a particular promotor so as to obtain an economically optimum process, i.e. there is no technical reason precluding the use of higher amounts of promoter.

Sodium carbonate is used in concentration of 20 to 80 g/l, preferably 40 to 60 g/l. As equivalent compounds e.g. potassium carbonate or ammonium carbonate can be used.

It is also contemplated that mixtures of promoters can be used, except it is preferable to avoid mixtures of (a) a soluble salt of an aminocarboxylic acid with (b) an amine having no carboxyl groups.

Particular mixtures of promoters are those consisting essentially of sodium carbonate, vanadium, sodium thiocyanate and at least one soluble salt of an amino carboxylic acid selected from the group consisting of aminoacetic acid, imido-bis-acetic acid, and aminopropionic acid and at least one amine selected from the group consisting of monoethanolamine, diethanolamine, triethanolamine, dimethylethanolamine, methyldiethanolamine, methylaminoethanol, dimethylaminopropanol and 2(2-aminoethoxy)ethanol.

It is also preferred to employ in the scrubbing solution a sufficient amount of sodium thiocyanate to prevent the formation of thiosulfate in the scrubbing solution.

According to another embodiment of the process of this invention, the disclosed promoters can be used as complexing agents in vanadium-containing, oxidative hydrogen sulfide scrubbing liquors. This can then lead, for example, to using anthraquinonedisulfonic acid as the promoter and one of the aforementioned compounds or mixtures thereof as complexing agents.

The capability of the described promoters acting as complexing agents can be easily seen by the color of the washing liquor: a reduced washing liquor containing only vanadium but no promoters has a black color caused by the reduced, uncomplexed vanadium. In the presence of the described promoters, however, no black compounds come into appearence and even the reduced liquor remains bright.

Without further elaboration, it is believed that one skilled in the art can, using the preceeding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

A scrubbing solution having the following composition is employed:

| | |
|---|---|
| $Na_2CO_3$ | 20 g/l |
| Vanadium | 1.5 g/l (Corresponding to a load of the scrubbing solution with 500 mg $H_2S/l$) |
| NaSCN | 20 g/l |
| X (promoter) | 50 g/l |

Sodium thiocyanate (also called rhodanate or rhodanide) functions to prevent formation of thiosulfate in the scrubbing solution.

The regeneration and/or reoxidation of the vanadium reduced by the $H_2S$ oxidation was measured, using the above-indicated scrubbing solution under identical conditions, as follows:

| | |
|---|---|
| loading | 200 mg $H_2S/l$ |
| temperature: | 35° C. |

The following table sets forth the proportions (%) of vanadium which were reoxidized after 40 minutes oxidation time:

| Component X (Promoter) | % Regenerated |
|---|---|
| None | 15 |
| Diethanolamine | 100 |
| Dimethylethanolamine | 100 |
| Diethylamine | 100 |
| Butylamine | 60 |
| Hexamethylenediamine | 100 |
| Dimethylaminopropanol | 100 |
| Aminoacetic acid | 98 |
| Piperidine | 80 |

As can be seen from the table, the use of amines as promoters has an especially favorable effect on the reoxidation of tetravalent vanadium.

The reason for the effectiveness of the herein described promoters is different compared with washing liquors containing aromatic compounds as promoters. Without being bound by an explanation of the mechanism of the promoters of this invention, it is believed that the effectiveness of the described promoters in accelerating the reoxidation of reduced vanadium is caused by influencing the redox-potential of the reduced vanadium. This can be demonstrated by measuring the redox-potentials of the reduced washing liquors: all and only those promoters, which have been found to be effective with respect to the acceleration of vanadium-reoxidation create a special redox-signal in connection with the reduced vanadium, which does not appear, e.g., in a reduced Stretford or similar washing liquor containing aromatic compounds as promoters. In those solutions, however, it has been found that the redox-potential of the dissolved oxygen has been shifted by the presence of the aromatics. With the herein described promoters the redox-potential of the dissolved oxygen is not influenced compared with a promotor-free solution.

In the following table there is shown the shift of the redox potential of the dissolved oxygen by the presence of DEA as an example for an amine compared to the use of ADA:

|  |  | potential of the $O_2$ signal |
|---|---|---|
| 20 g/l $Na_2CO_3$, | air saturated | +0.18 V |
| 20 g/l $Na_2CO_3$ 50 g/l DEA | air saturated | +0.18 V |
| 20 g/l $Na_2CO_3$ | air saturated | +0.17 V |
| 20 g/l $Na_2CO_3$ 3 g/l ADA | air saturated | +0.09 V |

As can be seen from this table there is no effect in the $O_2$ potential when DEA is added to $Na_2CO_3$ as compared to pure $Na_2CO_3$. However, if there is added ADA to $Na_2CO_3$ there is significant $O_2$ shift.

In the now following table the redox-potentials of reduced vanadium for different amines are listed.

| (a) $Na_2CO_3$/V/NaSCN | no concentrated peak proportional to V(4+) at 0.06 V |
|---|---|
| (b) $Na_2CO_3$/V/DEA/NaSCN | V(4+) at 0.06 V |
| (c) $Na_2CO_3$/V/diisopropanolamine | V(4+) at −0.02 V |
| (d) $Na_2CO_3$/V/triethylenetetramine | V(4+) at +0.06 V |
| (e) $Na_2CO_3$/V/amino acetic acid | V(4+) at −0.05 V |
| (f) $Na_2CO_3$/V/ADA/NaSCN | — |
| (g) $Na_2CO_3$/V/tetrahydrofurane | — |
| (h) $Na_2CO_3$/V/dioxane | — |

It was found that the signal of the reduced vanadium (V 4+) occurs in the range between +0.1 to −0.1 V. Comparing a and b it can be seen that the potential really is effected by the presence of DEA because without the amine there is no increase in the potential. Furthermore, it can be seen that examples f to h do not cause any effect. Although ADA favors reoxidation there is no signal of the V(4+) potential but there is the above-described effect in the $O_2$ potential.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. In a process for the simultaneous absorption and oxidation of hydrogen sulfide to sulfur, comprising the steps of scrubbing in a scrubbing stage a gas consisting essentially of a sour gas containing $H_2S$ with an aqueous, alkaline scrubbing solution containing pentavalent vanadium as the oxidizing agent, wherein the hydrogen sulfide is absorbed by the scrubbing agent and oxidized by pentavalent vanadium to elemental sulfur with reduction of the pentavalent vanadium to tetravalent vanadium, and then in a regeneration stage, separate from the scrubbing stage, regenerating the thus-reduced scrubbing solution in the presence of a promoter by reoxidation of the tetravalent vanadium gas to pentavalent vanadium with a gas containing molecular oxygen, the improvement wherein the scrubbing solution consists essentially of sodium carbonate, vanadium, and an amine promoter.

2. A process according to claim 1, wherein the promoter is either a soluble salt of an aminocarboxylic acid or an amine having no carboxyl groups.

3. A process according to claim 1, wherein sodium thiocyanate is present in the scrubbing solution in sufficient amounts to prevent the formation of sodium thiosulfate therein.

4. A process according to claim 2, wherein sodium thiocyanate is present in the scrubbing solution in sufficient amounts to prevent the formation of sodium thiosulfate therein.

5. A process according to claim 1, wherein the promoter is an alkylamine or an alkanolamine.

6. A process according to claim 1, wherein the promoter is at least one of diethylamine, butylamine, triethylenetetramine, hexamethylenediamine, or N,N'-bis(3-aminopropyl)ethylenediamine.

7. A process according to claim 1, wherein the promoter is at least one of mono-, di-, or triethanolamine, dimethylethanolamine, methyldiethanolamine, dimethylaminopropanol, 2(2-aminoethoxy)ethanol, or methylaminoethanol.

8. A process according to claim 1, wherein the promoter is diethanolamine.

9. A process according to claim 1, wherein the promoter is at least one of aminoacetic acid, imido-bis-acetic acid or aminopropionic acid.

10. A process according to claim 1, wherein the promoter is employed in a concentration of 10–100 g/l.

11. A process according to claim 1, wherein the promoter is employed in a concentration of 30–50 g/l.

12. A process according to claim 1, wherein the promoter is a mixture of classes of compounds other than a mixture of amines having no carboxyl groups with amines having carboxyl groups.

13. A process according to claim 1, wherein the scrubbing liquid contains anthraquinone disulfonic acid and said promoter functions as a complexing agent.

14. An alkaline scrubbing solution for the scrubbing of gases containing $H_2S$, said solution consisting essentially of sodium carbonate, vanadium, sodium thiocyanate and at least one soluble salt of an amino carboxylic acid selected from the group consisting of aminoacetic acid, imido-bis-acetic acid, and aminopropionic acid.

15. An alkaline scrubbing solution for the scrubbing of gases containing $H_2S$, said solution consisting essentially of sodium carbonate, vanadium, sodium thiocyanate and at least one soluble salt of an amino carboxylic acid selected from the group consisting of aminoacetic acid, imido-bis-acetic acid, and aminopropionic acid and at least one amine selected from the group consisting of monoethanolamine, diethanolamine, triethanolamine, dimethylethanolamine, methyldiethanolamine, methylaminoethanol, dimethylaminopropanol and 2(2-aminoethoxy)ethanol.

16. A scrubbing solution according to claim 15, wherein the amine is diethanolamine.

* * * * *